US009438133B2

(12) United States Patent
Wang et al.

(10) Patent No.: US 9,438,133 B2
(45) Date of Patent: Sep. 6, 2016

(54) ALTERNATING CURRENT-TO-DIRECT CURRENT CIRCUIT

(75) Inventors: Baojun Wang, Guangzhou (CN); Xiangyang Yin, Guangzhou (CN)

(73) Assignee: MORNSUN GUANGZHOU SCIENCE&TECHNOLOGY LTD., Guangdong (CN)

( * ) Notice: Subject to any disclaimer, the term of this patent is extended or adjusted under 35 U.S.C. 154(b) by 137 days.

(21) Appl. No.: 14/357,215

(22) PCT Filed: Apr. 28, 2012

(86) PCT No.: PCT/CN2012/074878
§ 371 (c)(1),
(2), (4) Date: Jul. 31, 2014

(87) PCT Pub. No.: WO2013/131315
PCT Pub. Date: Sep. 12, 2013

(65) Prior Publication Data
US 2014/0376290 A1   Dec. 25, 2014

(30) Foreign Application Priority Data
Mar. 6, 2012  (CN) .............................. 201210056555

(51) Int. Cl.
*H02M 7/217*   (2006.01)
*H02M 1/42*   (2007.01)
*H02M 7/06*   (2006.01)

(52) U.S. Cl.
CPC ........... *H02M 7/217* (2013.01); *H02M 1/4266* (2013.01); *H02M 7/06* (2013.01); *H02M 7/2176* (2013.01)

(58) Field of Classification Search
CPC .. H02M 1/4266; H02M 7/06; H02M 7/2176; H02M 7/217
See application file for complete search history.

(56) References Cited

U.S. PATENT DOCUMENTS

| 5,652,825 A * | 7/1997 | Schmider ............ H02M 7/2176 318/814 |
| 6,154,375 A * | 11/2000 | Majid ..................... H02M 1/36 323/901 |
| 7,227,763 B1 * | 6/2007 | Noh .................... H05B 41/2856 315/307 |
| 2010/0027299 A1 * | 2/2010 | Fang .................. H02M 3/33507 363/21.15 |
| 2011/0032652 A1 * | 2/2011 | Shimada ............... H02M 5/293 361/91.2 |
| 2011/0316446 A1 * | 12/2011 | Kang ................ H02M 3/33507 315/297 |

* cited by examiner

Primary Examiner — Emily P Pham
Assistant Examiner — Demetries A Gibson
(74) Attorney, Agent, or Firm — George G. Wang; Bei & Ocean

(57) ABSTRACT

An AC to DC circuit includes a rectifier circuit, a voltage detecting circuit, the current source and the output circuit. The rectifier circuit converts the AC power to pulsating DC. The constant current source provides current to the voltage detection circuit and to the control port of the output circuit. The current passing throughout the constant current source is the sum of the current flowing to the voltage detection circuit and to the output circuit. The voltage detection circuit increases with the instantaneous value of the output voltage of the rectifier circuit, it absorbs more current from the current provided by the constant current source and less current flows from the constant current source to the control port of the output circuit. The output circuit amplifies the current of the control port and outputs it to power the load. The AC to DC circuit of the present invention can rectify the portion of an alternating input voltage below a sine peak of the alternating current, working at a sine wave ascending area and a sine wave descending area, and it can carry a capacitive load.

5 Claims, 11 Drawing Sheets

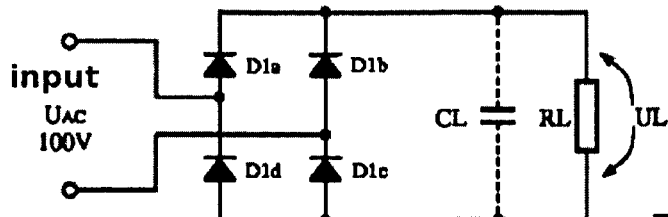
FIG. 4-3
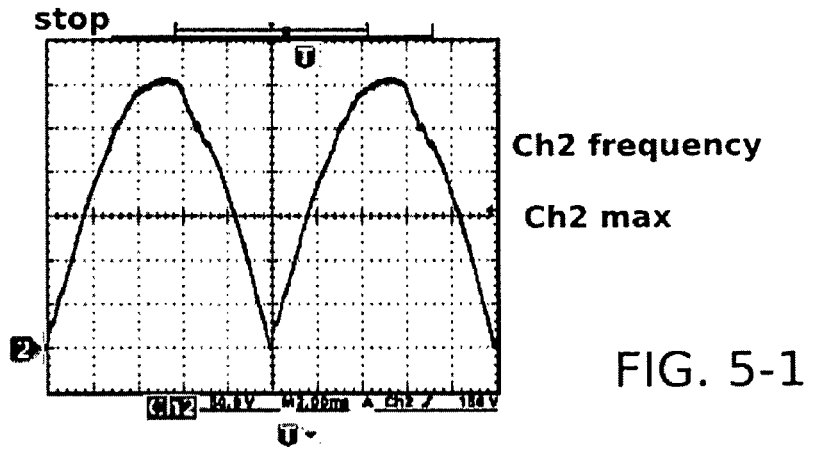
FIG. 5-1
FIG. 5-2
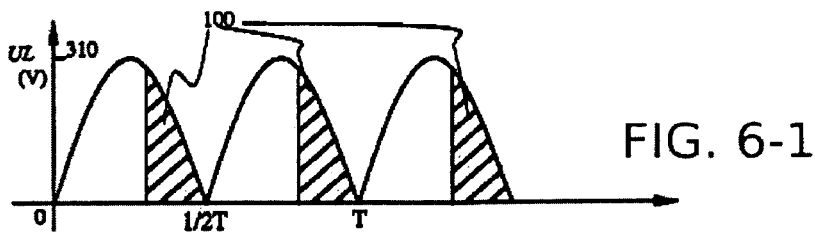
FIG. 6-1

ALTERNATING CURRENT-TO-DIRECT CURRENT CIRCUIT

CROSS-REFERENCE TO RELATED APPLICATIONS

This application claims priority from CN Application No. 201210056555.9, filed Mar. 6, 2012 and PCT Application No. PCT/CN2012/074878, filed Apr. 28, 2012, the contents of which are incorporated herein in the entirety by reference.

FIELD OF THE INVENTION

The present invention relates to an AC to DC circuit, particularly to AC to DC circuits used in low power AC/DC power Supplier.

BACKGROUND OF THE INVENTION

It is common to covert AC to DC, which can be achieved by using a rectifier circuit. Generally, industrial and civilian power are supplied through the AC power. Taking civilian power as an example, China uses 220 VAC/50 Hz, the Americas uses 120 VA or 110 VAC, 60 Hz, while the UK uses 240 VAC/50 Hz. Other countries and regions may also vary from one to another. Overall, the frequency is divided into two groups: 50 Hz or 60 Hz, with the operating voltage at about 110V and 220V. AC power is characterized in that the direction and amplitude of the voltage (or current) are periodically changing with time, as shown in FIG. 1.

AC changes sinusoidally with time shown in FIG. 1, it is called an alternating sinusoidal voltage, the time needed for repeating a change is called a cycle of alternating voltage, represented by T. The 220V voltage value commonly known in the art refers to the effective value and the peak voltage is $\sqrt{2}$ times the effective value, namely:

$$220V \times \sqrt{2} = 311.1V$$

The DC voltage (or current) does not change the amplitude and direction with time. The voltage (or current) that does not change direction but may undergo some degree of changes in voltage or current with time is also referred to as the DC voltage.

For industrial and civilian applications, there are needs for turning AC into DC. The process includes first making the current flow in one direction, called unidirectional conductivity, and then making the amplitude stabilized, called filtering. The process of making the AC power turn into unidirectional power is called rectification.

In the existing art, the rectifier circuit is generally divided into half-wave rectifier, full-wave rectifier, bridge rectifier and voltage doubler rectifier circuit. It may be a single-phase and multi-phase rectifier circuit (such as three-phase). In general, the rectifier circuit means a single-phase rectifier circuit. In fact, the single-phase rectifier circuit can be used as a multi-phase rectifier by using simple techniques known in the art.

FIG. 2-1 shows a half-wave rectifier circuit, if the capacitance CL is not connected, the output waveform is shown in FIG. 2-2, as a pulsating DC. With the capacitance CL connected, the output waveform is shown in solid lines in FIG. 2-3, as a relatively smooth pulsating DC. After the circuit enters a steady state, rectifier diode D1 in FIG. 2-1 conducts only during the time from t1 to t2 in FIG. 2-3, charging capacitor CL. Outside this period, capacitance CL is discharging to load RL. For getting a smoothed DC voltage, a larger capacitance CL is necessary. However, the increased capacitance CL causes a shorter conduction time, i.e., the time from t1 to t2. The charging current is large, and thus the circuit in this short period of time consumes a large amount of the AC input current, causing grid voltage waveform distortions. The reference to this principle can be found in the book "Stable Power Supply", the 1984 edition, published by People's Post (China), ISBN 15045. Figure 2.4.1 on page 33 of the book fully described this principle.

FIG. 3-1 shows a full-wave rectifier circuit, which is generally not used directly in the rectifier in civilian appliances. It is generally used only after having a transformer to obtain two voltages of the same value but opposite phase (center-tapped). If the capacitance CL is not connected, the output waveform is shown in FIG. 3-2, which is a pulsating DC; when the capacitance CL is connected, the output waveform is shown in solid lines in FIG. 3-3, which is a relatively smooth pulsating DC. After the circuit enters a steady state, rectifier diode D1a in FIG. 3-1 conducts and charges CL capacitor only during the time from t1 to t2 shown in FIG. 3-3, and rectifier diode D1b conducts and charges capacitor CL only during the time from t3 to t4. The diode charges capacitor CL when conducted and in other times, capacitance CL discharges to load RL. To get a smoothed DC voltage, a large capacitance CL is necessary, and the increased capacitance CL causes the conduction time from t1 to t2 and from t3 to t4 becomes very short. The charging current is large and the circuit consumes a large amount of the AC input current in this short period of time, causing grid voltage waveform distortions via the transformer. Figure 24.3 on page 35 of the book "Stable Power Supply" described this principle. The distorted waveform is no longer a sine wave, but higher harmonics, which can turned into base waves via Fourier transform. Higher harmonic wave is a source of interference in the power supply.

FIGS. 4-1, 4-2 and 4-3 show a bridge rectifier circuit. The three representation methods are all commonly used, showing the same the connection relationship. FIG. 4-2 is a simpler representation. If capacitance CL is not connected, the output waveform is the same as shown in FIG. 3-2, which is a pulsating DC; when the capacitance CL is connected, the output waveform is shown in solid lines in FIG. 3-3, which is a relatively smooth pulsating DC. After the circuit enters a steady state, rectifier diode D1a and D1c in FIG. 4-1 and FIG. 4-2 charge CL capacitor only in the time from t1 to t2 (FIG. 3-3) when they are conducting. Rectifier diode D1b and D1d charge CL capacitor only in the time from t3 to t4 when they are conducting. The diodes are charging the capacitor CL only when conducted and, in other times, capacitance CL discharges to load RL. To get smoothed DC voltage, a large capacitance CL is necessary. The large capacitance CL however causes the conduction time from t1 to t2 and from t3 to t4 become very short. Consequently, the charging current is large, and consumes a large amount of the AC input current in the short period of time, causing grid voltage waveform distortions. The third paragraph on page 34 of the book "Stable Power Supply" states: "For the full-wave rectifier capacitor filter case, the reader can analyze it according to Figure 24.3, and this analysis also applies to the bridge rectifier."

For the above described half-wave rectification, full-wave rectifier, the bridge rectifier, the capacitor's voltage rate must be greater than 1.414 times of the input voltage (i.e., the peak voltage). For the 220V AC input, considering the mains voltage instability, the voltage can often rise to about 264V, and the filter capacitor's voltage rate is required to be greater than the peak voltage 373V. To have a safety margin, the capacitor should be of a grade capable of handling a voltage of 400V or 450V.

In summary, the prior art rectifier circuits described above all require a large filter capacitor in order to obtain a smooth DC voltage. The circuit absorbs electric current from the mains only when close to the peak, a large number of consumer electronics, industrial equipment are all doing so and thus the sine wave voltage grid becomes seriously distorted. FIG. 5-1 shows an example of the voltage waveform recorded in the Guangzhou Huangpu Eastern Zone Industrial Park at 8:17 am, Feb. 24, 2012. FIG. 5-2 shows another example of the voltage waveform recorded in the same place at 8:39, Feb. 24, 2012 when most of the factories are in operating. In order to clearly see the waveform, it was recorded using a rectifier circuit without filter capacitor. As shown in FIG. 5-2, the electricity consumption increased when the factories came into operation in the morning, and the waveform further distorted. In the top of FIG. 5-2, the waveform becomes significantly more flat, which is consistent with the above theoretical analysis.

Currently, the power factor correction circuit has been used to solve this problem (referred to as PFC circuit). In the rectifier circuit, a small "filter capacitor" is used to absorb spikes of interference from the mains, such as 0.1 uF to 0.47 uF. The waveform after being rectified will be consistent with FIG. 3-2. Then, by using BOOST topology switching power supply, the voltage is increased to about 400V DC before supplying the power to other circuitry. This is to achieve a high power factor, and avoid the grid voltage waveform distortion.

FIG. 6 shows a method of using the SCR technology to avoid consuming large current when close to the peak. When SCR is used behind the rectifier circuit, the resulting waveform is shown in FIG. 6-1, shaded area 100 means the output area. The drawback of this method is that it does not work with large capacitive loads, and can only work at the descending part of the half-wave. For the reason why it cannot work with large capacitive loads, please refer to the book "Stable Power Supply" (between "3. Inverted L-shaped filter" on page 38 and "4. π-type filter" on page 40).

When SCR is used between the thyristor rectifier circuit and the AC power, the resulting waveform is shown in FIG. 6-2. The current triggering technology however will cause the trigger point asymmetry between the positive half cycle and a negative half cycle, which is shown in FIG. 6-2, where shaded areas 101 are not equal. The drawback of this method is that it does not work with large capacitive loads, and can only work at the descending part of the half-wave.

In low power applications, the PFC circuit is not commonly used due to its higher cost. Thus, in low power applications, AC to DC rectifier circuits are still commonly used which sink large amounts of current from the AC mains when close to the peak, leading to the grid voltage waveform distortion.

SUMMARY OF THE INVENTIONS

Accordingly, the technical problem to be solved by the present invention is to provide an AC to DC converting circuit, which does not sink current when close to the peak of the sine wave of the alternating current, but instead does it in the areas below the peak, i.e., the initial rising phase before the peak and final declining phase after the peak, respectively and which can work with a capacitive load.

To solve the above problems, the present invention provides a DC to AC circuit comprising a rectifier circuit, a voltage detecting circuit, a constant current source and an output circuit.

The constant current source provides a current (inflow or outflow) to the voltage detection circuit and to the control port of the output circuit. The amount of the current from the constant current source is the sum of the current to the voltage detection circuit and the current to the output circuit.

The voltage detection circuit's voltage increases with the instantaneous value of the output voltage of the rectifier circuit. The more current that the voltage detection circuit absorbs from the constant current source, the less current that will flow to the control port of the output circuit.

The output circuit first amplifies the current from the constant current source to the control port before outputting the current.

More preferably, the output terminal of the output circuit is also equipped with a voltage detection circuit, in order to achieve a more precisely regulated output voltage.

The invention also relates to the use of the above AC to DC circuit in low power AC/DC power suppliers.

The working principle of the present invention is described as follows: the rectifier circuit turns the civilian AC current into the pulsating DC current, the waveform of which is as shown in FIG. 2-2 and FIG. 3-2. The voltage of the voltage detection circuit increases with the instantaneous value of the output voltage of the rectifier circuit. When more of the current provided by the constant current source is absorbed by the voltage detection circuit, the less current will flow to the control port of the output circuit. The output current of the output circuit circuit is an amplified current from its control port. This realizes the following:

When instantaneous value of the output voltage of the rectifier circuit is smaller than the preset voltage, the current absorbed by the voltage detection circuit is less than the current provided by the constant current source. Thus, some of the constant current flows to the control port of the output circuit, which will become the output current (at a voltage same as the output voltage of the rectifier circuit).

When instantaneous output voltage of the rectifier circuit equals to the preset value, all the current provided by the constant current source is absorbed by the voltage detection circuit and thus no current flows to the control port of the output circuit and consequently there is no output from the output circuit. If the output voltage of the rectifier circuit is greater than the preset value, the result is the same, i.e., there is no output from the output circuit.

Therefore, when the preset value is set below the AC voltage peek, the present invention achieves the intended result: the circuit does not absorb the current when close to the peak of the sine wave while it operates at the lower parts of the sine wave, i.e., the initial part of the rising phase and the final part of the declining phase, respectively. When operating as the rising phase, the output voltage of the rectifier circuit increases from zero to the preset value and the current to the control port of the output circuit undergoes a change from a larger value to a smaller value. the current at the control port will be the output current of the output circuit after being amplified, which similarly undergoes a change from a larger value to a smaller value. In this way, there is no sudden change in the current signal, thereby avoiding interference to the city mains.

When operating at the declining phase, the situation is the same except that the current at the control port and the output current of the output circuit undergoes a change from zero to a small value.

BRIEF DESCRIPTION OF THE DRAWINGS

FIG. 2-1 is a half-wave rectifier circuit;

FIG. 2-2 is a waveform diagram of the output voltage of a half-wave rectifier circuit when the filter capacitor is not connected;

FIG. 2-3 is a waveform diagram of the output voltage of a half-wave rectifier circuit with the filter capacitance is connected;

FIG. 3-1 is a circuit diagram of a full-wave rectifier circuit;

FIG. 3-2 is an output voltage waveform of a full-wave (or bridge) rectifier circuit when the filter capacitor is not connected;

FIG. 3-3 is an output voltage waveform of a full-wave (or bridge) rectifier circuit when the filter capacitor is connected;

FIG. 4-1 is a circuit diagram of a bridge rectifier circuit;

FIG. 4-2 is a bridge rectifier circuit in a simpler drawing form;

FIG. 4-3 is a bridge rectifier circuit in another drawing form;

FIG. 5-1 is a grid voltage waveform in an industrial zone before working hours;

FIG. 5-2 is a grid voltage waveform in the industrial zone during working hours;

FIG. 6-1 is a waveform diagram when using SCR technology after rectifying;

FIG. 6-2 is a waveform diagram when using SCR technology before rectifying;

FIG. 7-1 a circuit block diagram of a first embodiment of the present invention;

FIG. 7-2 is a specific circuit diagram of the first embodiment in FIG. 7-1;

FIG. 7-3 is a waveform diagram of the first embodiment measured at an input voltage of 110V/50 HZ;

FIG. 7-4 is a waveform diagram of the first embodiment measured at an input voltage of 71V/50 HZ;

FIG. 7-5 is a waveform diagram of the first embodiment measured at an input voltage of 110V/50 HZ, which has a filter capacitor connected therein;

FIG. 14-1 of the circuit block diagram of a fifth embodiment of the present invention;

FIG. 14-2 is the specific circuit diagram of the fifth embodiment in FIG. 14-2;

FIG. 14-3 is a waveform diagram of the fifth embodiment measured at an input voltage of 110V/50 HZ;

FIG. 14-4 is a waveform diagram of the fifth embodiment measured at an input voltage of 110V/50 HZ, which has a filter capacitor connected therein;

DETAILED DESCRIPTION OF PARTICULAR EMBODIMENTS OF THE INVENTION

Example I

Figure 1:
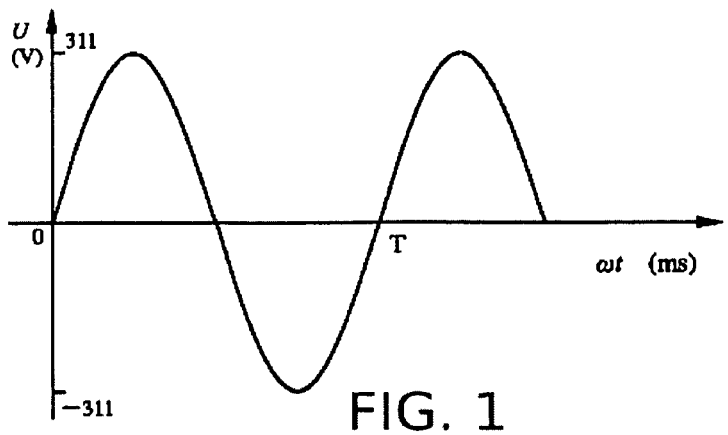
FIG. 1 shows the changes over time of the AC sinusoidal waveform.
Figures 1, 2:
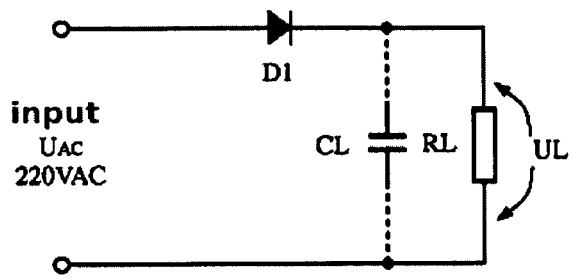
Figure 2:
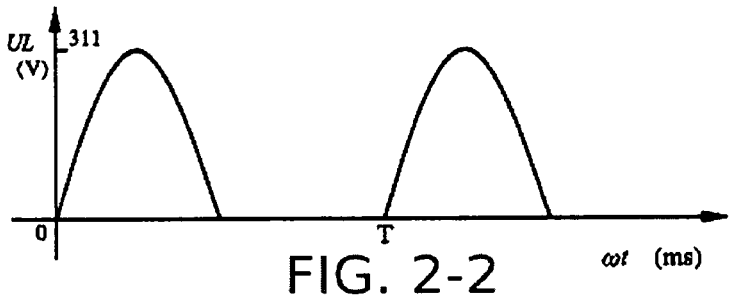
Figures 1, 7:
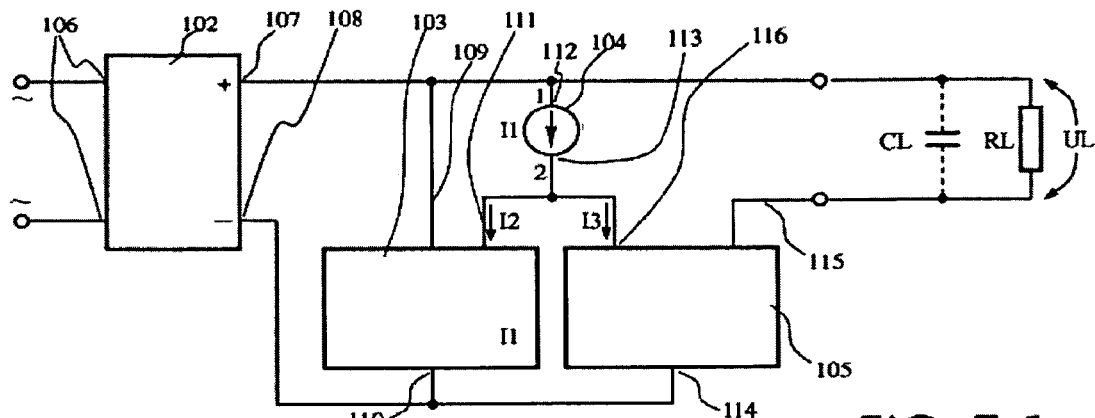
Figures 2, 7:
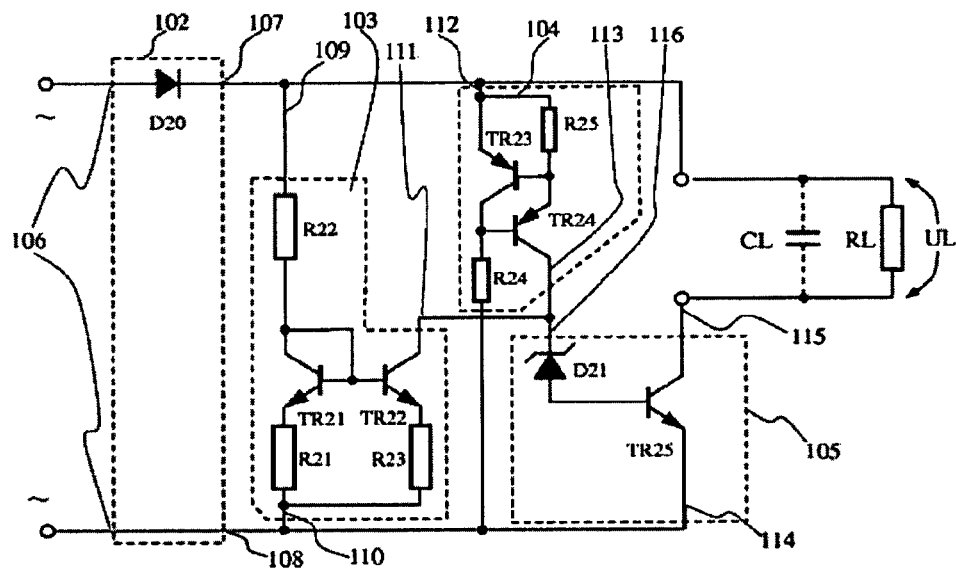
Figures 3, 7:
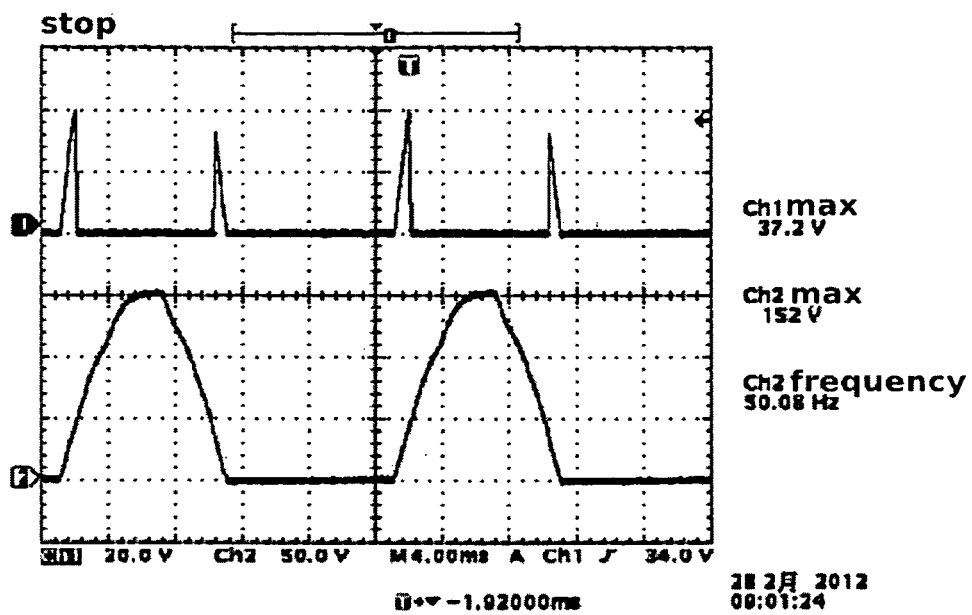
Figures 4, 7:
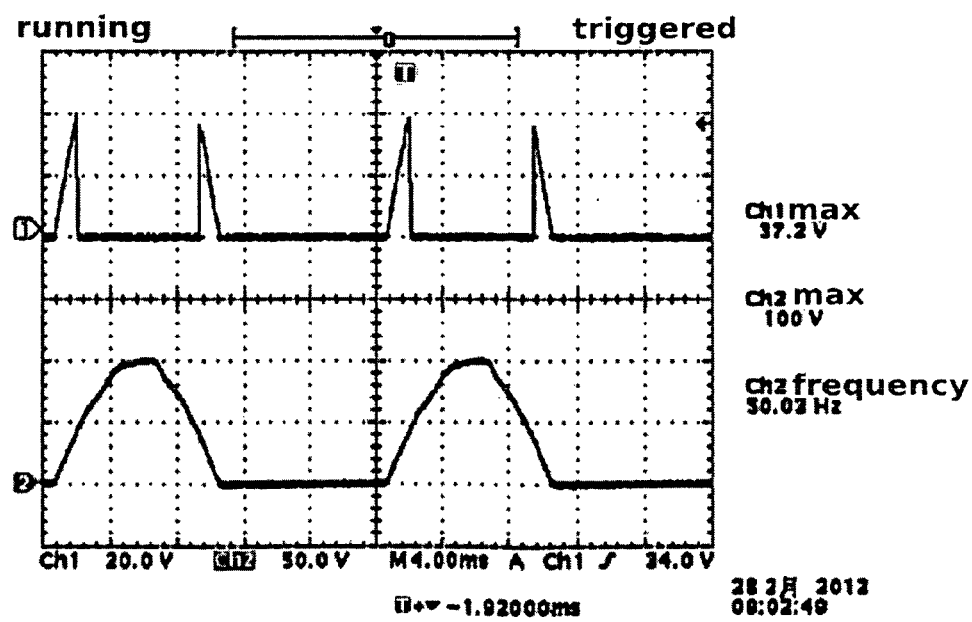

FIG. 7-1 shows a block circuit diagram of a first embodiment, and FIG. 7-2 shows its corresponding circuit schematic diagram. FIG. 7-1 details the connection relationship among the components, which include a rectifier circuit 102, a voltage detection circuit 103, a constant current source 104, an output circuit 105. AC power source is connected to the AC input terminal 106 of the rectifier circuit, which has two terminals (i.e., two 106, which are theoretically indistinguishable with each other). Rectifier circuit's output ends 107 and 108 are connected in parallel with voltage detection circuit 103. The voltage detection circuit has at least three ports, positive input port 109, negative input port 110, and output port 111. The constant current source 104 has at least two ports, an inflow end 112 and outflow end 113. The output circuit 105 has at least three ports, input port 114, output port 115, and control port 116. The ports 109 and 110 of the voltage detection circuit are connected to the output ends 107 and 108 of the rectifier circuit 102, respectively. The output port 111 of the voltage detection circuit is connected to the control port 116 of the output circuit 105 as well as outflow end 113 of the constant current source 104. The inflow end 112 is connected to the positive output end 107 of the rectifier circuit 102. The negative output end 108 of the rectifier circuit 102 is connected to the input port 114 of the output circuit 105. The output port 115 of the output circuit 105 constitutes the negative output terminal of the AC to DC circuit of the present invention while the positive output end 107 of the rectifier circuit constitutes the positive output terminal of the AC to DC circuit of the present invention.

Figures 2, 3:
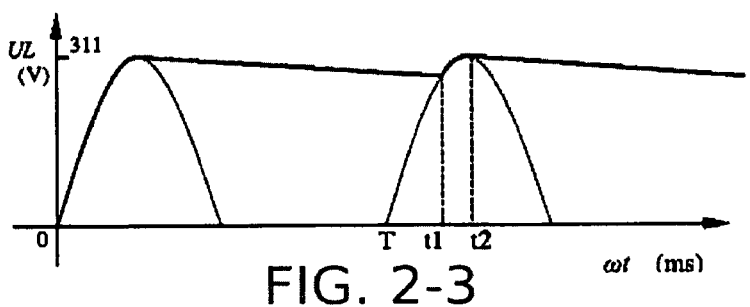
Figures 1, 3:
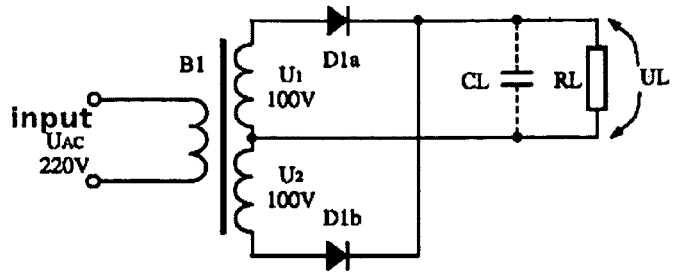
Figures 2, 3:
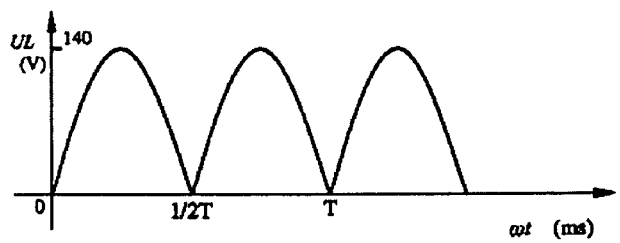
Figure 3:
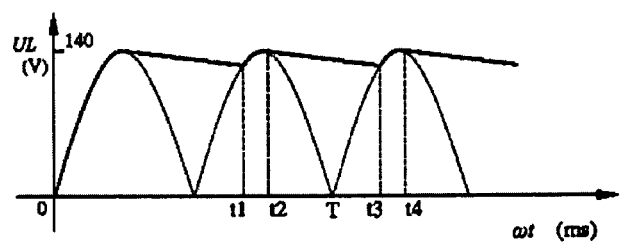

The working principle of the present invention is: rectifier circuit 102 rectifies the AC power into pulsating DC current, with the waveform shown in FIG. 2-2 or 3-2. Voltage detection circuit 103's voltage rises with the instantaneous voltage value at the output end of rectifier circuit 102. When voltage detection circuit 103 absorbs more current at its output terminal 111 from the constant current source 104, less current will be flowing to the control port 116 of the output circuit 105. The current flowing to control port 116, after being amplified, will be the output current of the output circuit 105. Therefore, when the instantaneous output voltage value of rectifier circuit 102 is smaller than the preset voltage value, the current flows to port 111 is less than current II (the current provided by the constant current source 104) and some of the current is flowing to control port 116, which then is amplified as the output current of output circuit 105.

When the instantaneous output voltage of rectifier circuit 102 equals to the preset voltage value, the current passing through port 111 is in the same amount as current II provided by 104, and no current will flow through control port 116. Thus, there will be no output current from 105;

When the instantaneous output voltage of rectifier circuit 102 exceeds the preset voltage value, the current flows to port 111 is also in the same amount as current II and no current will flow through control port 116. Thus, there will be no output current from 105.

Capacitance CL and load resistance RL are added to the drawings to show a completeness of an actual implementation.

FIG. 7-2 is a circuit diagram of the first embodiment. The technical effects achieved by this embodiment are now illustrated with the actual test data along with a discussion of working principles. The circuit parameters are as follows:

Rectifier circuit 102 is composed of a diode D20 (1N4007), which is a half-wave rectifier circuit. Voltage detection circuit 103 is composed of resistor R21, resistor R22, resistor R23, NPN-type transistor TR21, and NPN type transistor TR22, where R21 and R23 are connected at one end, which forms the negative input end 110, while the other end of R21 is connected to the emitter of TR21; the base and collector of TR21 are connected, which are further connected with the base of TR22 as well as one end of R22; the other end of R22 becomes the positive input end 109; the other end of R23 and emitter of TR22 are connected; and the collector of TR22 becomes the output end 111.

Resistor R21 is 51 KΩ, resistor R22 is 10 MΩ, resistor R23 is 1 KΩ, and transistors TR21 and TR22 are NPN transistors (Model No 2N5551). Constant current source 104 is composed of resistor R24, resistor R25, PNP transistor TR 23, and a PNP transistor TR24. This circuit is known in the art, and is described in the book titled "Analog Electronic Technology", second edition, ISBN number 7-04-000868-8/TN.53 (see Figure P3-21 on page 266, P3-32 on page 270). Thus, it will not be elaborated here. The constant current is approximately according to formula (I):

$$Io = \frac{U_{BE}}{R_{25}}$$

wherein Io is the constant current at the collector of transistor TR24 in FIG. 7-2 or I1 in FIG. 7-1, $U_{BE}$ is the voltage drop between the base and emitter of transistor TR23, which generally is 0.6V or taking the actual value measured, and $R_{25}$ is the resistance value of resistor R25.

When for some reason that the collector current of the transistor TR24 becomes larger, the emitter current of the transistor TR24 will be synchronically increasing, which increases the voltage drop across resistor R25, so that the base current of transistor TR23 increases, the transistor TR23 amplifies the base current and its collector current becomes larger. This in turn increases the base voltage of the transistor TR24, so that the collector current of the transistor TR24 would return back to the value according to formula (1).

When for some reason that the collector current of the transistor TR24 becomes smaller, the emitter current of the transistor TR24 will be synchronically decreasing, which decrease the voltage drop across resistor R25, so that the base current of the transistor TR23 becomes smaller, the transistor TR23 reduces the base current and its collector current becomes smaller. This in turn decreases the base voltage of transistor TR24, so that the collector current of the transistor TR24 would also return to the value according to formula (1).

Resistor R24 is 3.3 MΩ, resistor R25 is 5.1 KΩ, transistor TR23 is 2N5401, and transistor TR24 is a PNP transistor (Model No A92), which is characterized by the following measured data in Table 1:

| Number | Vin operating voltage(V) | the collector of the transistor TR24 Output Current(uA) |
|---|---|---|
| 1 | 5 | 88.3 |
| 2 | 10 | 85.3 |
| 3 | 20 | 89.7 |
| 4 | 30 | 92.1 |
| 5 | 40 | 93.4 |
| 6 | 50 | 94.8 |
| 7 | 60 | 95.9 |
| 8 | 100 | 96.3 |
| 9 | 200 | 97.8 |
| 10 | 300 | 98.1 |

In Table 1, the operating voltage refers to the voltage between ends 108 and 112 in FIG. 7-2. The measured data demonstrate that a constant current is generally achieved by the TR24.

Output circuit 105 is composed of voltage regulator diode D21 and NPN type transistor TR25. The negative terminal of D21 becomes the control port 116 of the output circuit while the positive terminal of D21 is connected to the base of the transistor TR25. The emitter of transistor TR25 becomes the input port 114 of the output circuit and the collector of the transistor TR25 becomes the output port 115 of the output circuit. D21 is 3.3V regulator. TR25 is an NPN transistor Model No A42 in duplicates.

The working principle of the circuit is the same as described above in the summary of the invention and will not be repeated here. To facilitate the measurement, the capacitance CL used is a 47 uF/100V electrolytic capacitor, and the load resistor RL used is adjustable resistor of a resistance range between 1-10 KΩ.

After the circuit assembly is complete, prior to connecting capacitor CL, as shown in FIG. 7-2, observe and record via channel 2 of the oscilloscope the waveforms between 108 and 107 and then observe and record via channel 1 the DC output waveform between 115 and 107 (the oscilloscope is made by Tektronix, Model No TDS3012C). Two channels may be monitored simultaneously by using an additional isolation probe. The channel reference numbers are provided in the left side of the drawings, channel 1 as "1" in a small white box and channel 2 as "2" in the little black box.

FIG. 7-3 is the measured waveform (with the additional isolation probe) at input AC power of 110V/50 Hz (It seems that the AC half-wave distortion is obvious but we did not find a more perfect sine wave for the measurement). As can be seen from the waveform of channel 1, for each half-wave, the circuit of the present invention conducts twice, with an input peak value being 152V while the output peak voltage being 37.2V.

Figures 1, 4:
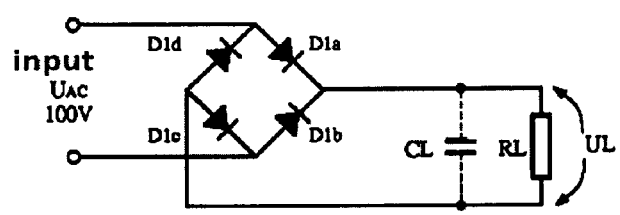
Figures 2, 4:
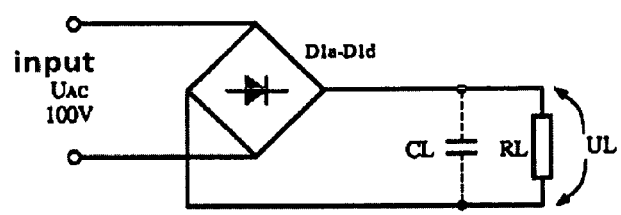
Figures 2, 6:
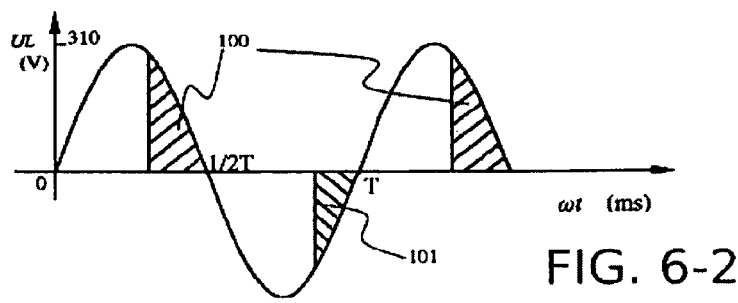

When the input AC is reduced to about 71V/50 Hz, the measured waveform is shown in FIG. 7-4. The input peak voltage is accordingly reduced to 100V, but the output voltage peak is still 37.2V. It means that the output voltage of the circuit of the present invention is not affected by the input voltage but entirely determined by the circuit's own parameters, thereby realizing a constant voltage output when the load remains the same.

Figures 5, 7:
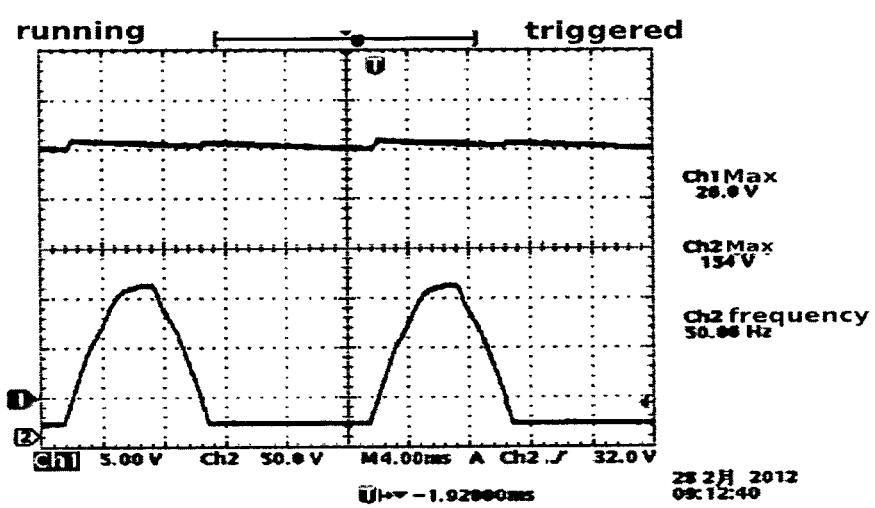

After capacitance CL is connected (i.e., adding the filter capacitor), with the load resistor RL set as 1 KΩ, the measured output waveform is shown in FIG. 7-5. The upper curve in FIG. 7-5 is the waveform across the load resistor, which is a smoother DC. As can be seen, for each half-wave, it charges twice. By comparison, it charges only once in the existing technology.

In fact, with ordinary skill in the art, the user can easily obtain a rectified current of different voltages and maximum currents by changing parameters of the components of the circuit of the present invention. Thus, the present invention has achieved its objects both at the theoretical level and practical level.

Embodiment II

Figure 8:
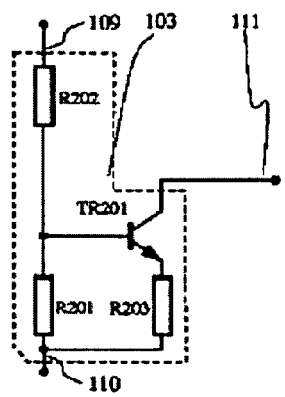
FIG. 8 is a voltage detection circuit.

The second embodiment is obtained by replacing the voltage detection circuit 103 of FIG. 7-2 with the circuit shown in FIG. 8, while keeping the connection relationship as exactly the same as the first embodiment.

FIG. 8 is a voltage detection circuit which is composed of resistor R201, resistor R202, resistor R203 and transistor TR20. The positive input end 109 is an end of resistor R202, The other end of R202 is connected to R201 and further connected to the base of TR201. The other end of the resistor R201 is connected to one end of resistor R203, with the connection point forming the negative input end 110. The other end of resistor R203 is connected to the emitter of transistor TR201, whose collector forms the output terminal 111. In fact, this is a standard amplification circuit known in the art. The voltage between 109 and 110 is the input voltage, referred to as Vin, and the current absorbed by output port 111 can be calculated according to formula (2):

$$I2 \approx Ie = \frac{Vin \times \frac{R201}{R201+R202} - Ube}{R203}.$$

wherein, $U_{be}$, generally between 0.5V and 0.8V, is the voltage drop between the base and the emitter of TR201 (commonly taking a value between 0.6V and 0.7V in calculation). As indicated by formula (2), the collector current of TR201 is proportional to input voltage Vin, that is, the absorbed current by the voltage detection circuit increases with the rise of the working voltage up to the maximum value limited by the constant current source 104 (shown in FIG. 7-1). When all the current from 104 is consumed by the output port 111, the output circuit 105 will have nothing left to output. Based on this principle, the rectification point can be preset with a suitable value in the circuit of the present invention.

Figure 9:
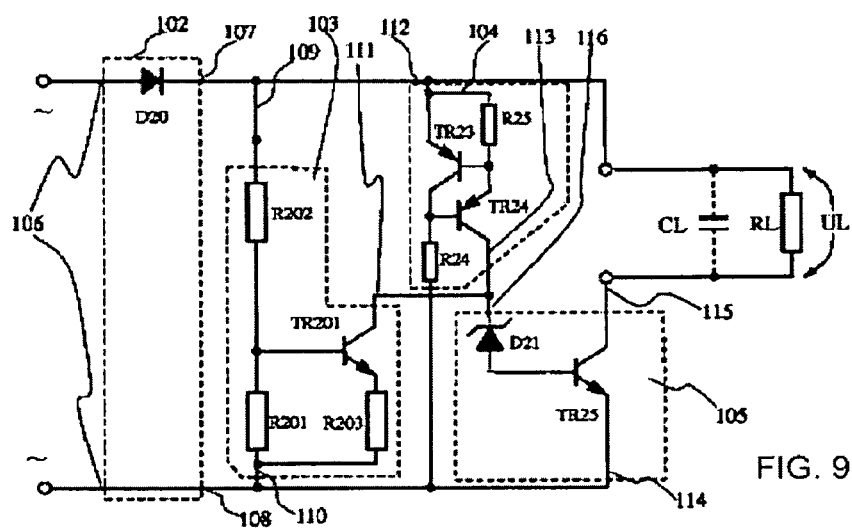
FIG. 9 is a circuit diagram of a second embodiment of the present invention.

The working principle of the second embodiment is shown in FIG. 9, which is the same as the first embodiment except for the voltage detection circuit 103. For detection circuit 103 in FIG. 9: resistor R201 is 270 KΩ, resistor R202 is 9.1 MΩ, resistor R203 is 5.1 KΩ, transistor TR201 is Model No S9014.

Measured with 110V/50 HZ AC input or lower, the object of the present invention can all be realized, with the output characteristics almost identical to FIGS. 7-3, 7-4, and 7-5, which have measured values at 37.9 V, 37.9V, and 26.5V, respectively.

The working principle of the circuit is the same as described above in the summary of the invention section and thus will not be repeated here.

In fact, for people of ordinary skill in the art, they can easily obtain rectified outputs with different voltages and maximum currents via modifications of the circuit.

Embodiment III

Figure 10:
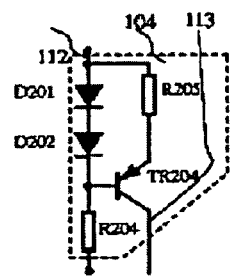
FIG. 10 is a constant current source.
Figure 11:
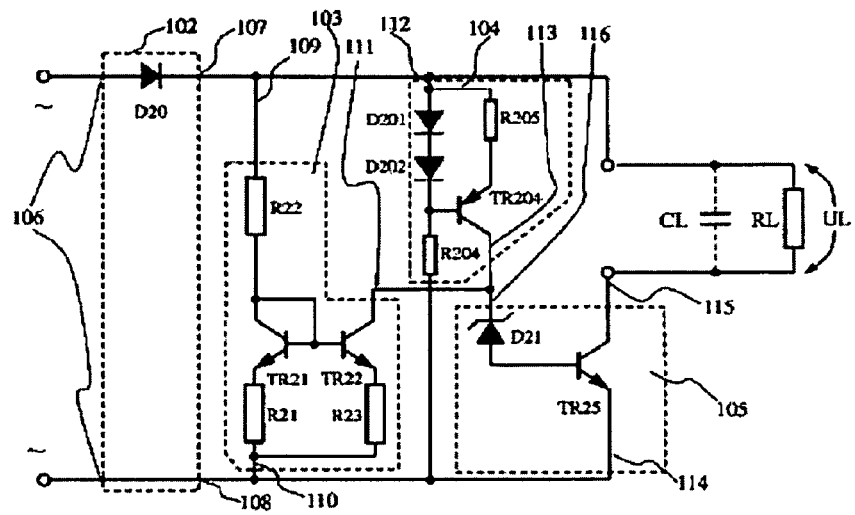
FIG. 11 is a circuit diagram of a third embodiment of the present invention.

It is obtained by replacing the constant current source 104 in FIG. 7-2 with the one shown in FIG. 10, while keeping the connection relationship identical to the first embodiment. FIG. 11 shows is a schematic diagram of this embodiment. FIG. 10 is a constant current source 104, containing resistor R204, resistor R205, diode D201, diode D202, and transistor TR204. The anode of D201 is connected to R205, with the connection point becoming the inflow port 112 of the constant current source 104, the cathode of D201 is connected to the anode of D202, the cathode of D201 is connected to resistor R204, which is further connected to the base of TR204, whose emitter is connected to the other end of R205 and whose collector becomes the outflow port 113 of the constant current source. The other end of R204 is connected to the negative output port 108 of the rectifier circuit 102. In fact, this circuit is a known constant current source circuit, and the constant current I1 provided by the circuit is according to formula (3):

$$I1 \approx Ie = \frac{U_{D201} + U_{D202} - Ube}{R205}.$$

Embodiment IV

Figure 12:
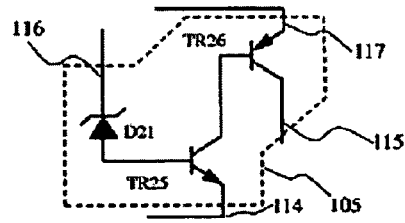
FIG. 12 is an alternative output circuit.

For this embodiment, output circuit 105 has at least three ports, input port 114 and output port 115, and control port 116. This embodiment can be obtained by replacing the output circuit 105 in FIG. 7-2 with the one shown in FIG. 12 while keeping all the connection relationship exactly the same as Embodiment I. The working principle of this embodiment is shown in the FIG. 13. As shown in FIG. 12, output circuit 105 is composed of diode D21, NPN type transistor TR25, PNP type transistor TR26. D21's negative end becomes the output circuit's control port 116 and D21's positive end is connected to the base of the transistor TR25. TR25's emitter becomes the output circuit's input end 114. TR25's collector is connected to the base of transistor TR26, whose emitter becomes the output circuit's input port 117. As mentioned above, the output circuit has at least three ports, and this input port 117 is newly added as its fourth port. The collector of TR26 becomes the output terminal 115 of the output circuit.

When TR25's collector has current, the current flows to the base of TR26 and is amplified by TR26 and outputted. The difference is that port 115 in this embodiment becomes the positive terminal of the eventual output, and the rectifier circuit's negative output end 108 becomes the negative terminal of the eventual output.

Figure 13:
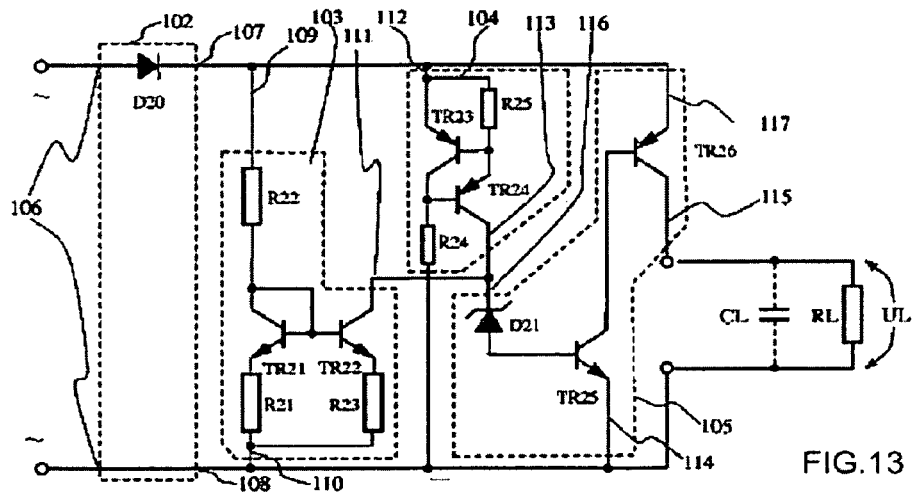
FIG. 13 is a circuit diagram of a fourth embodiment of the present invention.

The principle of the fourth embodiment is shown in FIG. 13 and, except for the output circuit 105, it is the same as Embodiment I and will not be repeated here.

Similarly, for people of ordinary skill in the art, they may adjust the parameters of the circuit's components to get rectified DC power of different voltages and maximum currents.

For embodiments I-IV, the rectifier circuit can be replaced with a switch bridge rectifier and would still achieve the same object of the invention.

Embodiment V

Figures 1, 14:
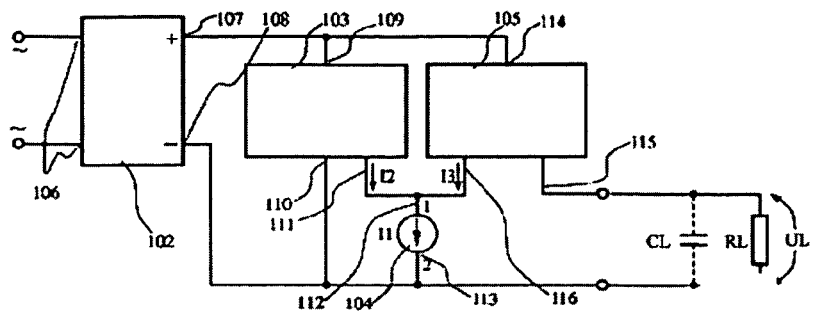
Figures 2, 14:
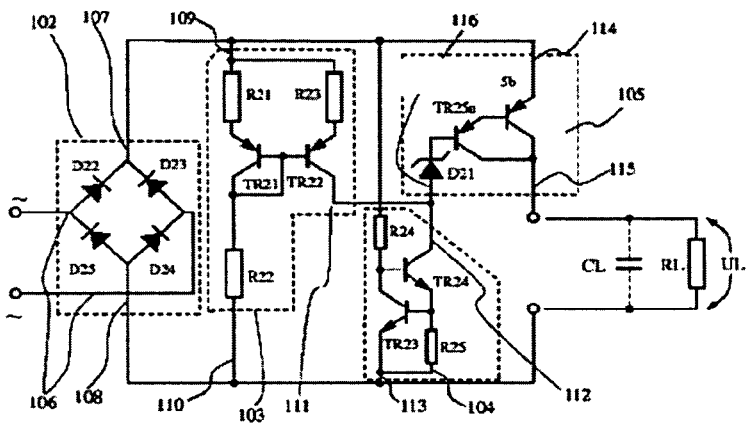
Figures 3, 14:
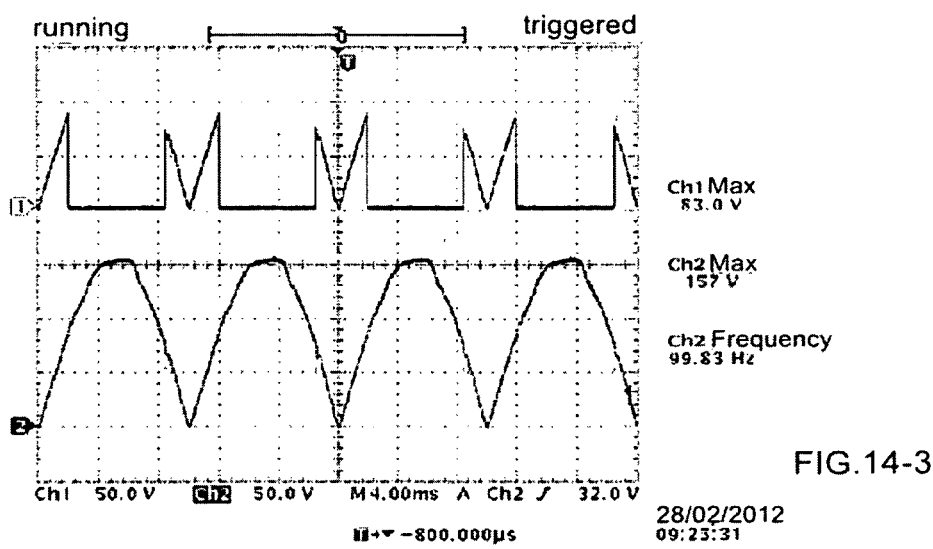
Figures 4, 14:
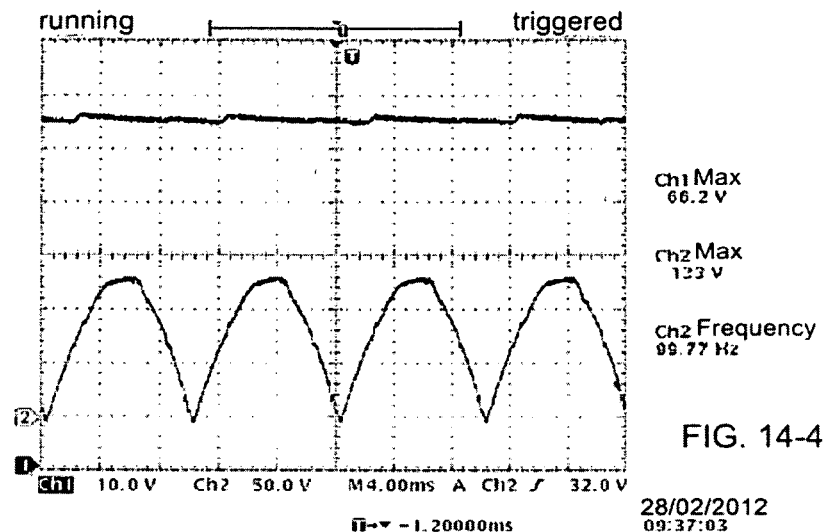

FIGS. 14-1 and 14-2 show the circuit diagram of the fifth embodiment. FIG. 14-1 shows a block diagram of connection relationships of the components, including rectifier circuit 102, voltage detection circuit 103, constant current source 104, output circuit 105. Input terminal 106 of the rectifier circuit connects to the AC. The two input terminals 106 are indistinguishable and need not be referenced differently. 102's output terminals 107 and 108 connect in parallel to the voltage detection circuit, which has at least three ports: positive input end 109, negative input end 110, and output port 111. Constant current source 104 has at least two ports, inflow end 112 and outflow end 113. Output circuit 105 has at least three ports, input port 114, output port 115, and control port 116. 109 and 110 of the voltage detection circuit are connected to 107 and 108 of the rectifier circuit, respectively. The voltage detection circuit's output end 111 is connected to the control port 116 of the output circuit 105 and at the same time connected to inflow end 112 of the constant current source. The constant current source's outflow end 113 is connected to the negative output end 108 of the rectifier circuit 102, whose positive output end 107 is connected to input port 114 of the output circuit 105. The output port 115 becomes the positive terminal of the eventual output of the AC to DC circuit of the present invention while its negative terminal is 108 of the rectifier circuit 102.

Capacitance CL and load resistance RL are added to illustrate the effect of an actual application.

FIG. 14-2 is a specific circuit diagram of the fifth embodiment. In the following, the technical effects of this embodiment in FIG. 14-1 is illustrated with the actual test data together with a description of the working principle. The parameters of the circuit are as follows: rectifier bridge rectifier circuit 102 is composed of four diodes, D22, D23, D24, and D25. The negative terminals of D22 and D23 are connected to form the positive output port 107 of the rectifier 102. The positive terminals of D24 and D25 are connected to form the negative output port 108 of rectifier 102. The positive terminal of D22 and the negative terminal of D25 are connected to form AC input end 106 and the positive terminal of D23 and the negative terminal of D24 are connected to form the other AC input end 106.

Voltage detection circuit 103 is composed of resistor R21, resistor R22, resistor R23, and PNP type transistor TR21, and PNP type transistor TR22. Resistors R21 and R21 are connected at one end to form the positive input port 109 of the voltage detection circuit. The other end of the R21 is connected to the emitter of TR21, whose base and collector are connected together at a point which is further connected to the base of TR22 as well as one end of the R22. The other end of R22 is the negative input port 110 of the voltage detection circuit. The other end of R23 is connected to the emitter of TR22, whose collector becomes the output port 111.

Constant current source 104 is composed of resistor R24, resistor R25, NPN type transistor TR23 and NPN type transistor TR24. This is a known circuit in the art. R24 is connected to the base of TR24 at one end and its other end is connected to the positive output end 107 of rectifier 102. TR24's collector is the inflow end 112 of constant current source 104. TR23's emitter is connected to R25, forming 104's outflow end 113. The working principle is the same as Embodiment I except for different polarities of the transistors and thus will not be repeated here.

Output circuit 105 is composed of diode D21, PNP type transistor TR25a, and PNP type transistor TR25b. D21's anode becomes output port 116 of the output circuit and its cathode is connected to the base of TR25a, whose emitter is connected to the base of TR25b. The emitter of TR25b becomes the input port 114 of the output circuit. The collectors of the TR25a and TR25b are connected together to form output port 115 of the output circuit.

Working principle: rectifier circuit 102 turns civilian AC power into pulsating DC power, whose waveform is as shown in FIG. 2-2 or 3-2. The voltage detection circuit 103's voltage rises with the instantaneous output voltage of the rectifier circuit 102. The more current is absorbed through output port 111 of the voltage detection circuit, the less current is flowing to the output port 116 of the control circuit 105. The current flowing to port 116 will, after amplification, become eventual output current of the output circuit 105. This realizes the following effect:

When the instantaneous output voltage of the rectifying circuit 102 is smaller than the preset value, port 111 absorbs less current than provided by the constant current source 104, i.e., I2<I1, and there is current flowing through control port 116, which will be outputted as rectified current at the same instantaneous voltage as outputted from 102.

When the instantaneous output voltage of the rectifying circuit 102 equals to the preset value, port 111 absorbs the same amount of current as provided by the constant current source 104, i.e., I2=I1, and there is no current flowing through control port 116. Consequently, there is no eventual output current.

When the instantaneous output voltage of the rectifying circuit 102 is greater than the preset value, port 111 would absorb more current as provided by the constant current source 104, but for the fact that I1 remains constant, I2 can only equal to I1. The result is the same as the above: no current flowing through control port 116 and no eventual output current.

As such, the object of the present invention is realized. In the following, the technical effect is demonstrated with a set of actual test data. In order to facilitate the measurement, 47 uF/100V electrolytic capacitors was used as capacitance CL and an adjustable resistor 1-10 KΩ's was used as load resistance RL. In FIGS. 14-2, D22, D23, D24, and D25 are all 1N4007; D21 is a 5.1V regulator; R21 is 51 KΩ, R22 is 20 MΩ, R23 is 1 KΩ, R24 to 3.3 MΩ, R25 is 5.6 KΩ, TR21 and TR22 are 2N5401 PNP type transistors; TR23 and TR24 are 2N5551 NPN type transistors; and TR25a and TR25b are of Model No A92.

After the circuit assembly is complete, but without connection of capacitor CL, as shown in FIG. 14-2, the waveform across 108-107 is monitored in channel 2 of the oscilloscope (Tektronix TDS3012C), while at the same time the waveform of the output of the AC to DC circuit of the present invention (i.e., across 115 and 108) is monitored in channel 1 of the oscilloscope (its ground end connected to 108). References to the channel numbers are provided in the left side of the figure: the channel 1 as "1" in a small white box and channel 2 as "2" in the small black box.

FIG. 14-3 is the actually measured waveform. AC input is 110V/50 Hz. From the waveform shown in channel 2, it can be seen that the AC half-wave has obvious distortion, but no better sine wave could be obtained for the measurement. As can be seen from the waveform in channel 1, for each half wave, the circuit of the invention conducted twice. While the input half wave peak is 157V, the peak of the output from the circuit is 83.0V.

When the input AC is reduced to about 71V/50 Hz, and input half-wave peak is correspondingly reduced to 100V, but the circuit's output voltage peak is still 83.0V, which is consistent with the working principle, that is, the output voltage of the AC to DC circuit is not affected by the input voltage but it is rather determined by the circuit's parameter itself. This realizes the technical effect: when load remains the same, the output voltage remains stable.

When capacitance CL (filter capacitor) is added to the circuit and the load resistor RL is set to 1 KΩ, the measured output waveform is shown in FIG. 14-4. The upper curve is the waveform across the load resistor, showing a smooth DC with a voltage approximately 66.2V. For each half-wave, it charges twice, in comparison to the prior art where it charges only once.

Clearly, the object of the present invention is realized both at the theoretical level and the practical level.

In fact, for those with ordinary skill in the art, they can easily adjust the parameters of the circuit's components to obtain rectified AC power of different voltages and maximum currents. For example, among embodiments II-IV, the object of the present invention can similarly be achieved if rectifier circuit 102, voltage detection circuit 103, constant current source 104, output circuit 105, or any combination thereof is taken from one embodiment to replace its counterpart in another embodiment.

Embodiment VI

Figure 15:
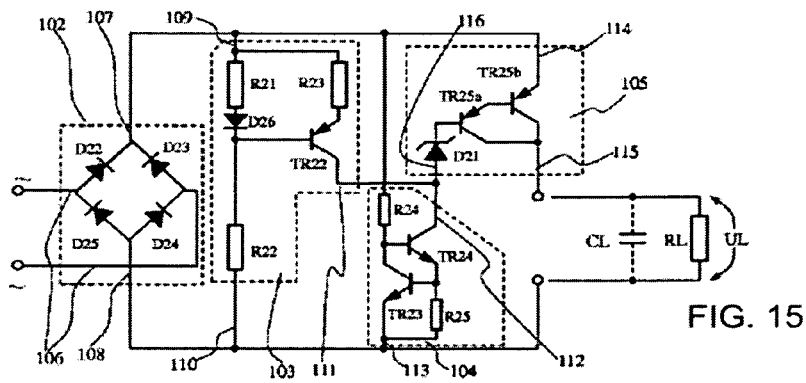
FIG. 15 is a circuit diagram of a sixth embodiment of the present invention.

The change made in FIG. 15 (over FIG. 14-2) is the replacement of voltage detection circuit 103. The voltage detection circuit 103 now is composed of resistor R21, resistor R22, resistor R23, diode D26, and PNP transistor TR22. R21 and R23 are connected at one end, forming the input positive end 109. The other end of R21 is connected the positive terminal of D26, whose negative terminal is connected to the base of TR22 and one end of R22. R22's other end becomes the input negative end 110. R23's other end is connected to the emitter of TR22, whose collector becomes the output port 111 of the voltage detection circuit.

Working principle of the sixth embodiment is the same as the fifth embodiment and is able to achieve the same object of the present invention.

Embodiment VII

Figure 16:
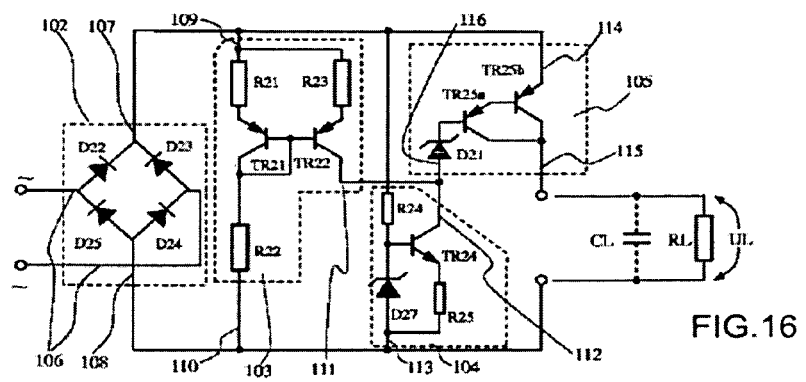
FIG. 16 is a circuit diagram of a seventh embodiment of the present invention.

The change made in FIG. 16 (over FIG. 14-2) is the replacement of constant current source 104. 104 now is composed of resistor R24, resistor R25, NPN transistor TR24 and Zener diode D27. This is a known circuit in the art. D27's positive terminal is connected to R24 and the base of TR24. The other end of R24 is connected to the positive output end 107 of rectifier circuit 102. The collector of TR24 becomes 104's inflow end 112. The negative terminal of D27 is connected to R25, forming 104's outflow end 113. This circuit will also provide a constant current.

Working principle of Embodiment VII is the same as Embodiment V and is able to achieve the same object of the present invention.

Embodiment VIII

Figure 17:
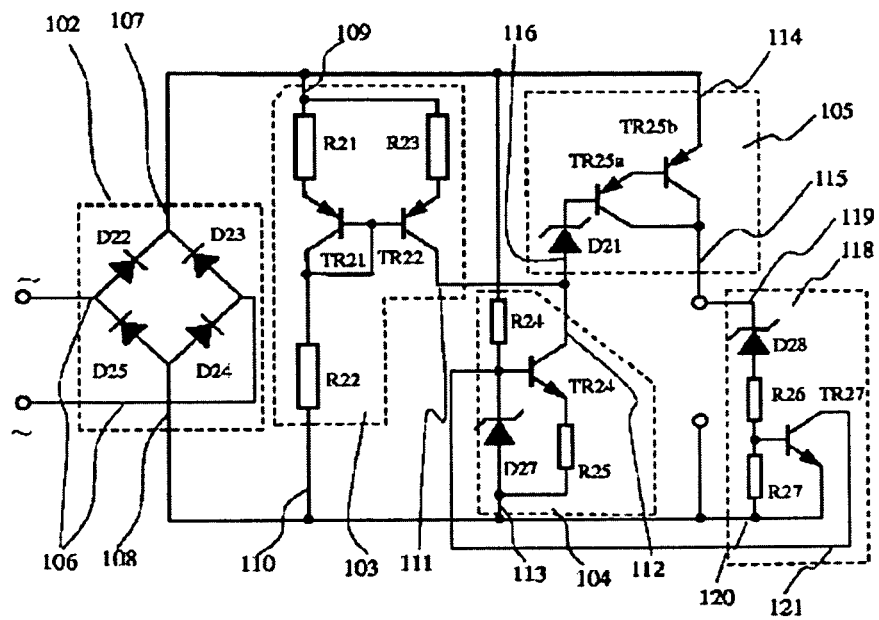
FIG. 17 is a circuit diagram of an eighth embodiment of the present invention.

As shown in FIG. 17, this embodiment is based on Embodiment VII and added with a voltage detection circuit 118. This voltage detecting circuit has at least three ports, input positive port 119, input negative port 120, and output port 121. In fact, voltage detection circuit 118 has the same function as voltage detection circuit 103. The ports 119, 120, 121 of circuit 118 correspond to circuit 103's ports 109, 110 and 111, respectively.

Voltage detection circuit 118 is composed of resistor R26, resistor R27, Zener diode D28, and NPN transistor TR27. D28's cathode becomes the circuit's input positive end 119 and its anode is connected to one end of R26, whose other end is connected to R27's one end and also to TR27's base. The other end of R27 is connected to the emitter of TR27, forming the input negative port 120. The collector of TR27 becomes the output port 121.

118's input positive port 119 is connected to the output end 115 of the output circuit 105 and 118's input negative port 120 is connected to the output negative terminal 108 of the AC to DC circuit of the present invention. 118's output port 121 is connected to the constant current source to ensure that TR27 is conducting and the constant current source is shut off when output voltage at 115 is too high. In this way, as there would be no current passing through the control port 116, it will stop working and shut off the circuit's output. In such situation, the output voltage will be maintained at a level according to the following formula (4):

$$Uout \approx U_{D28} + \frac{R27 + R26}{R27} \times 0.7$$

The voltage across R27 is restricted by TR27's conduction voltage drop, and then by taking advantage of this, the output voltage can be maintained according the formula (4), where $UD_{28}$ is the voltage regulating rate of D28.

Therefore, Embodiment VIII can not only achieve the object of the invention, but also can achieve a more precisely regulated output voltage. As a further improvement to Embodiment VIII, port 119 may be connected to the output terminal of a filter network, which can achieve an output with smaller voltage ripples.

The voltage detection circuit 118 may so be added to other above described embodiments (just need to pay attention to the polarities of diodes and transistors) to achieve the same technical purposes of the present invention.

Figure 18:
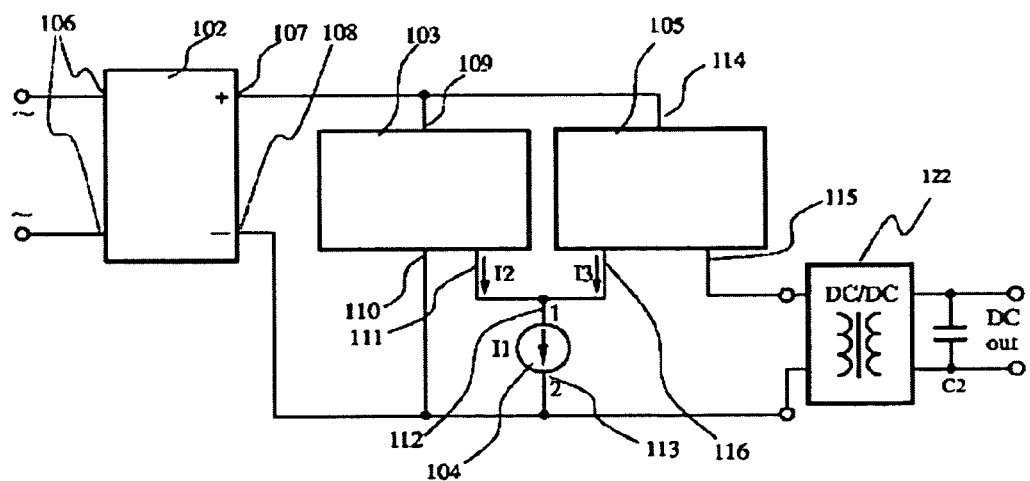
FIG. 18 is a topology of an AC/DC low-power non-isolated, isolated power circuit.

In the above described embodiments, if the "load resistor RL" is replaced with isolation or non-isolation DC/DC circuit, such as a self-excited push-pull converter, RCC (Ringing Choke Converter), flyback converter, one can achieve AC/DC low-power isolated power supplier, including regulated and non-regulated voltage outputs. FIG. 18 shows the circuit topology of such application, where 122 is the DC/DC converter (a switching power supplier). Similarly, as high-voltage non-polarity capacitors or high voltage electrolytic capacitors are not used, the AC/DC low-power isolated power supplier of the present invention can similarly be miniaturized, and no initial rush current occurs at startup.

If FIG. 18's 122 is replaced with a PFC circuit, it can also achieve satisfactory results.

The above presented are just preferred embodiments of the present invention, it should be understood that the above preferred embodiments should not be construed as limiting the present invention, and the scope of the invention should be determined by the claims. Those of ordinary skill in the art, may make further improvements and modifications without departing from the spirit and scope of the present invention. For example, replacement the transistor with a known composite transistor, replacing PNP transistors with NPN type transistors, and switching the power supply input voltage polarities, or replacing the piezoelectric ceramic isolated DC/DC converter with FET transistor. Those improvements and modifications should be regarded as within the scope of the present invention.

What is claimed is:

1. An AC to DC circuit, comprising a rectifier circuit having an output positive end and an output negative end, a voltage detection circuit having two input ports and one output port, a constant current source having an inflow end and an outflow end, and an output circuit having an input port, an output port and a control port, said rectifier circuit being in a parallel connection with said voltage detection circuit with said rectifier circuit's two output ends connected to said voltage detection circuit's two input ports, respectively, said outflow end of said constant current source being connected to both said output port of said voltage detection circuit and said control port of said output circuit, wherein the current flowing through said outflow end of said constant current source equals to the sum of the current flowing from said constant current source to said output port of said voltage detection circuit and the current flowing from said constant current source to said control port of said output port, and said output circuit amplifies said current flowing to said control port and output said amplified current to power a load.

2. The AC to DC circuit according to claim 1, wherein said circuit is capable of being preset so that when the voltage between said two output ports of said rectifier circuit reaches to a predetermined value all current from said constant current source flows to said output port of said voltage detection circuit and no current flows to said control port of said output circuit which accordingly provides no current to power an load.

3. The AC to DC circuit according to claim 1, wherein a second voltage detection circuit is connected to an output terminal of said output circuit.

4. The AC to DC circuit according to claim 1, wherein said circuit is capable of being adjusted by changing one or more of its parameters to vary output voltage and maximum current of said output circuit.

5. A low power AC/DC power supplier, comprising an AC to DC circuit according to claim 1.

* * * * *